United States Patent [19]
Robinson

[11] Patent Number: 6,074,702
[45] Date of Patent: Jun. 13, 2000

[54] COATING FOR PIPELINES, TANKS AND STRUCTURAL STEELWORK

[75] Inventor: Ian Robinson, Thirsk, United Kingdom

[73] Assignee: E. Wood Limited, United Kingdom

[21] Appl. No.: 09/247,228

[22] Filed: Feb. 10, 1999

[30] Foreign Application Priority Data

Feb. 11, 1998 [GB] United Kingdom .................... 9802950

[51] Int. Cl.[7] ...................................... B05D 1/34
[52] U.S. Cl. ........................... 427/386; 427/236; 427/426
[58] Field of Search ..................................... 427/421, 426, 427/236, 386

[56] References Cited

U.S. PATENT DOCUMENTS

| | | | |
|---|---|---|---|
| 4,540,750 | 9/1985 | Ham | 525/504 |
| 4,695,605 | 9/1987 | Goel | 525/109 |
| 4,748,201 | 5/1988 | Smith | 524/712 |
| 5,130,402 | 7/1992 | Akiyama et al. | 528/45 |
| 5,232,996 | 8/1993 | Shah et al. | 525/452 |
| 5,573,040 | 11/1996 | Schumacher et al. | 138/147 |
| 5,621,043 | 4/1997 | Croft | 525/111 |

*Primary Examiner*—Shrive Beck
*Assistant Examiner*—Jennifer Calcagni
*Attorney, Agent, or Firm*—David E. Rogers; Michael A. Lechter; Squire, Sanders & Dempsey

[57] ABSTRACT

A two-part coating system comprises a first part comprising a blend of an aliphatic polyisocyanate with a non-reactive resin or a liquid epoxide resin and a second part comprising an aromatic polyamine, such that the two parts when mixed together and applied to a surface form a rapid-setting impervious coating. The coating system is suitable for application by spraying using equipment in which the two parts of the system are first combined at the point of spraying, at the spray head. In particular the system may be used to apply an impermeable lining to the internal surfaces of pipelines, for example by means of a centrifugal spinning head.

8 Claims, No Drawings

COATING FOR PIPELINES, TANKS AND STRUCTURAL STEELWORK

THIS INVENTION relates to the development of a novel protective coating for the protection of tanks, pipelines and steel or other structures where a fast setting composition with rapid protection properties is required.

For many years, the oil, gas and water industries have specified and used a variety of materials for the internal and external protection of pipelines, tanks and associated steel equipment.

These materials have included coal-tar enamels, petroleum tapes, fusion bonded epoxies, asphalt, liquid applied epoxies and many many more.

More recently, coatings for the internal protection of pipelines in service have been used by the water industry in particular.

These coatings have been used to reline pipelines which have been in service for a number of years and which require refurbishment work to be carried out due to salt deposition, corrosion or a combination of both.

Refurbishment of water pipelines and indeed oil and gas lines can be carried out by the in situ formation of plastic linings or resin impregnated linings or by the application of a liquid applied coating such as an epoxy resin or a polyurethane resin formulation.

The application of a two-part liquid applied system involves the initial cleaning of the pipe using a mole or screw arrangement followed by water flushing and then the application of the liquid system itself using twin feed heated lines, a slave mixing assembly and finally, a centrifugal spinning head to apply the mixed product.

Using variations on this method, liquid applied epoxy coatings have been successfully applied to hundreds of kilometres of pipeline and have produced a smooth internal surface suitable for long term contact with drinking water.

The major disadvantage of such a resin system however lies in the fact that the coating has to be left for minimally 16 hours before the pipeline can be returned to service simply because the coating hardens very slowly at ambient temperatures of around 5° C.

This is a major drawback when considering pipelines which serve the public and which are required to be back in use as quickly as possible.

This delay in returning the pipeline to service has led to a demand for a coating which can be applied to the internal surface of pipelines and which will set rapidly thereby allowing the pipe to be returned to service within two to three hours with a minimum of disruption to the water supplies involved.

It is an object of the present invention to provide a rapid setting coating which can be applied to internal pipeline surfaces and which will allow the line to be returned to service within two to three hours of application.

According to one aspect of the invention there is provided a coating which comprises a liquid epoxide resin, an aliphatic polyisocyanate and a difunctional amine in any combination to produce a high performance, rapid-setting, lining system.

In its preferred form, the coating of the invention is a fast setting coating which can be applied to the internal surface of underground pipes and which will set in a matter of minutes to produce a lining which can be returned to service within two or three hours or less.

The lining material is preferably applied by a centrifugal spinning head and is spun onto the internal pipe surface at a controlled film thickness.

Ideally, the coating involved is not unduly affected by low temperatures or by surface moisture which is frequently present within underground pipelines.

Furthermore, due to the rapid setting nature of the coating involved, the preferred system can be applied to metal, mineral or even plastic surfaces and will provide a smooth lining without the surface defects often associated with conventional liquid applied epoxy coatings.

Due to the rapid setting nature of the preferred coating, the thickness of the applied film which can be achieved in one application may be from 250 microns to 5 mm or more.

The coating preferably sets within seconds of being applied to the surface in question, so that sagging, which is normally associated with high film thicknesses, does not occur.

The following Examples set out various formulations which were tried by the applicants, before the coating of the invention was arrived at, in attempt to find a fast setting coating which could be applied to underground and other pipelines in situ. In these Examples, as in the embodiments of the present invention to be described later, a two-part system was used to form the coating, that is to say a liquid resin and a liquid curing agent were supplied separately to a mixing site where the two components (resin and curing agent) were mixed, then sprayed onto the surface to be coated before the mixture set. Alternatively the two components could be mixed in the course of spraying.

Table I below shows the results obtained with formulations which involved a conventional liquid epoxy such as DER 331 from Dow Chemical Company reacted with amine and polysulphide curing agents to produce a pipe lining.

TABLE I

| Curing Agent | Thin Film Cure Time | Suitability for Contact With Potable Water |
| --- | --- | --- |
| Aliphatic Polyamine | 16 hours | Yes |
| Cycloaliphatic Polyamine | 24 hours | No |
| Aromatic Polyamine | 36 hours | No |
| Aliphatic Polyamine + 25 phr Polysulphide | 12 hours | No |
| Cycloaliphatic Polyamine + 25 phr Polysulphide | 16 hours | No |
| Aromatic Polyamine + 25 phr Polysulphide | 24 hours | No |

None of these systems could be considered suitable for use as a fast setting, in situ, coating due to a combination of high tainting properties and relatively slow curing characteristics at low temperatures.

In view of these results, a second series of tests was conducted on resin systems based on polyurethane technology.

In this series of tests, a number of proprietary polyurethane and poly(urethane-urea) systems were evaluated with respect to film cure, film integrity and effect on water quality.

Table II details the results obtained.

TABLE II

| Resin System | Thin Film Core (5° C.) | Suitability for Contact with Potable Water | Film Integrity in Presence of Water |
| --- | --- | --- | --- |
| Aromatic Polyurethane (1) | 60 mins | Yes | Severe foaming and blistering |
| Aromatic | 15 mins | Yes | Severe foaming |

TABLE II-continued

| Resin System | Thin Film Core (5° C.) | Suitability for Contact with Potable Water | Film Integrity in Presence of Water |
| --- | --- | --- | --- |
| Polyurethane (2) | | | and blistering |
| Aromatic Polyurethane-urea (1) | 5 mins | Yes | Severe foaming and blisterig |
| Aromatic Polyurethane-urea (2) | 2 mins | Yes | Severe foaming and blistering |

Several formulations in this series provided better results than the initial epoxy trails particularly with regard to speed of cure and suitability for contact with potable water.

However all formulations evaluated exhibited varying degrees of sensitivity to high levels of surface moisture and a further series of tests was carried out to try and eliminate this water sensitivity.

Table III details the results obtained.

TABLE III

| Urethane System | Catalyst | Thin Film Cure (5° C.) | Suitability for Contact with Potable Water | Film Integrity in Presence of Water |
| --- | --- | --- | --- | --- |
| Aromatic Polyurethane (1) | Tertiary Amine | 120 mins | Yes | Severe Foaming and Blistering |
| | Organo Metallic | 90 mins | Yes | Severe Foaming and Blistering |
| | Organo Metallic + Tertiary Amine | 60 mins | Yes | Severe Foaming and Blistering |
| Aromatic Polyurethane-urea | Tertiary Amine | 10 mins | Yes | Severe Foaming and Blistering |
| | Organometallic | 8 mins | Yes | Severe Foaming and Blistering |
| | Organo-metallic + Tertiary Amine | 5 mins | Yes | Severe Foaming and Blistering |

These results reinforced the view that whilst a pure polyurethane or urethane-urea would provide rapid cure characteristics and probably good water quality results, the systems involved were inheritedly sensitive to moisture regardless of the catalyst of the resin system used.

With a view to overcoming this problem of moisture sensitivity, the inventors decided to try different systems comprising various polyamine combinations mixed with proprietary aromatic polyisocyanates based on MDI.

Table IV details the results obtained.

TABLE IV

| Curing Agent | Gel Time | Thin Film Cure (5° C.) | Film Integrity in Presence of Water |
| --- | --- | --- | --- |
| Aliphatic Polyamine | Instantaneous | Not Assessed | Not Assessed |
| Cycloaliphatic Polyamine | Instantaneous | Not Assessed | Not Assessed |
| Aromatic Polyamine | 3 secs | 1 min | Foaming/Blistering |
| Poly(Oxypropylene) Diamine | 3 secs | 1 min | Foaming/Blistering |
| Poly(Oxypropylene) Triamine | 2 secs | 30 secs | Foaming/Blistering |

In the tests summarised in Table IV above, the polyurea systems resulting from the amine/isocyanate reaction were characterised by very rapid set times (typically <5 seconds) which would render them impractical as in situ applied lining systems. Furthermore, water sensitivity was still observed, albeit reduced when compared to pure urethane or urethane-based systems. The inventors accordingly decided to investigate the possibility of substituting alternative polyisocyanates in such systems. Table V below summarises the results of a further series of tests carried out to evaluate the effects of such alternative aliphatic polyisocyanates.

TABLE V

| Aliphatic Polyisocyanate | Curing Agent | Gel Time | Film Cure (5° C.) | Film Integrity in Presence of Moisture |
| --- | --- | --- | --- | --- |
| Biuret of HMDI | Aromatic Polyamine (1) | 30 secs | 2 mins | Excellent |
| | Aromatic Polyamine (2) | 45 secs | 3 mins | Excellent |
| | Aromatic Polyamine (3) | 5 mins | 15 mins | Excellent |
| Isocyanurate Trimer of HMDI | Aromatic Polyamine (1) | 30 secs | 2 mins | Excellent |
| | Aromatic Polyamine (2) | 45 secs | 3 mins | Excellent |
| | Aromatic Polyamine (3) | 5 mins | 15 mins | Excellent |
| Modified Polyisocyanate Derived from HMDI | Aromatic Polyamine (1) | 40 secs | 3 mins | Excellent |
| | Aromatic Polyamine (2) | 60 secs | 5 mins | Excellent |
| | Aromatic Polyamine (3) | 17 mins | 20 mins | Excellent |

It can be seen from these results that combinations of aliphatic polyisocyanates with selected aromatic polyamines can yield polyurea systems which exhibit rapid film cure times at low temperatures, together with insensitivity towards moisture. However, it was noted that many of these systems exhibited high linear shrinkage when curing, which would be a major disadvantage when considering internal pipelining applications. The inventors conceived the idea of blending with the aliphatic polyisocyanate a non-reactive or less reactive resin, with a view to reducing shrinkage, and tried a variety of blends of routine and non-routine resins, in combination with an aliphatic polyisocyanate/aromatic polyamine system.

Table VI below shows the results obtained for some of the systems tried which appeared to yield good results.

TABLE VI

| Resin Modification | Additional Level (Parts per 100 of Polyisocyanate) | Linear Shrinkage (%) |
| --- | --- | --- |
| Non-Reactive Resin (1) | 0 | 0.150 |
| | 15 | 0.110 |
| | 30 | 0.050 |
| Non-Reactive Resin (2) | 0 | 0.150 |
| | 15 | 0.120 |
| | 30 | 0.050 |
| Liquid epoxide resin (Diglycidyl ether of Bisphenol A) | 0 | 0.150 |
| | 15 | 0.090 |
| | 30 | 0.040 |

In the systems to which Table VI above relates, "Non-Reactive Resin (1)" was octyl benzyl phthalate and "Non-Reactive Resin (2)" was hydroxy modified aromatic hydrocarbon.

It can be seen from these results that the linear shrinkage of an aliphatic polyisocyanate/aromatic polyamine system can be reduced significantly by the inclusion, in accordance with the present invention, of either non-reactive or lower reactivity resins, whilst still retaining rapid film cure. The inventors postulated that the resultant extended gel time and reduced heat of reaction could lead ultimately to more complete cure and a reduced effect on water quality. A series of tests were therefore undertaken in order to compare the effects of the systems to which Table VI above relates on water quality, when these systems were used for lining water pipelines.

Table VII details the results obtained.

TABLE VII

| Resin Modification | Addition Level (Parts per 100 of Polyisocyanate) | Suitability for Contact with Potable Water |
|---|---|---|
| Non-Reactive Resin (1) | 15 | NO |
| | 30 | NO |
| Non-Reactive Resin (2) | 15 | NO |
| | 30 | NO |
| Liquid Epoxide Resin (Diglycidyl Ether of Bisphenol A) | 15 | YES |
| | 30 | YES |

In Table VII above, "Non-Reactive Resin (1)" and "Non-Reactive Resin (2)" were the same compounds as identically designated in relation to Table VI above. Whereas the last two entries in Table VII above utilised, as the liquid expoxide resin, diglycidyl ether of bisphenol A, diglycidyl ether of bisphenol F may be utilised instead, or a combination of the two.

These results show that the combination of an aliphatic polyisocyanate and an aromatic polyamine, modified by the inclusion of liquid epoxide resin, can yield a system with the necessary attributes for the in situ relining of drinking water pipelines. It can be seen that, by contrast, the inclusion of non-reactive resin modifiers has an unacceptable effect on water quality. However, such non-reactive resin modifiers may be used, in accordance with the invention, in applications other than water pipelines, such as linings or coatings for oil or gas pipelines or protective coatings for structural steelwork or for other metal components or structures, (as indeed, of course, may the system, in accordance with the invention, using liquid epoxide resin).

With particular regard to possible use for lining water pipelines, further work was carried out to optimise the additional level of liquid epoxide resin in terms of gel time, film cure and effect on water quality. The results are detailed in Table VIII.

TABLE VIII

| Liquid Epoxide Resin (Parts per 100 of Aliphatic Polyisocyanate) | Gel Time | Film Cure (5° C.) | Suitability for Contact with Potable Water |
|---|---|---|---|
| 0 | 40 secs | 2.5 mins | Yes |
| 10 | 50 secs | 3 mins | Yes |
| 20 | 60 secs | 4 mins | Yes |
| 30 | 75 secs | 4.5 mins | Yes |
| 40 | 90 secs | 5 mins | Yes |
| 50 | 120 secs | 8 mins | Yes |

The above results show that rapid curing systems offering suitability for contact with potable water can be produced over a wide range of levels of epoxide resin modification. However, from the point of view of in situ lining, gel times of 60–90 seconds allied to film cure times of 4–5 minutes have been established as being ideal, particularly where there may be a requirement to apply up to 5–10 mm thickness.

Practical in situ lining trials through centrifugal spinning head equipment have confirmed the practicality of such a material, with excellent film forming properties observed in the presence of residual water. Subsequent independent testing of the applied lining in accordance with BS6920 has confirmed its suitability for contact with drinking water.

The formulation, embodying the invention, employed in the last-noted trials was supplied as a two-part system, comprising Part A and Part B as set out below, the two parts being supplied along separate pipelines to apparatus in which the parts were mixed and simultaneously, or with minimal delay, sprayed onto the surface to be coated.

The preferred formulation had the following composition:

FORMULATION DETAILS

| | parts by weight (pbw) |
|---|---|
| PART A | |
| Aliphatic Polyisocyanate | 40 |
| Liquid Epoxide Resin | 15 |
| Titanium Dioxide | 5 |
| Potassium Sodium Aluminosilicate | 3 |
| Silica Flour | 35 |
| Fumed Silica | 2 |
| | 100 |
| PART B | |
| Aromatic Polyamine | 50 |
| Potassium Sodium Aluminosilicate | 3 |
| Silica Flour | 45 |
| Fumed Silica | 2 |
| | 100 |

The coating apparatus may comprise a centrifugal spinning head or a self-mixing spray gun assembly, or may comprise hot airless spray equipment.

Further evaluation involved a practical lining trial with the material being applied through a remote centrifugal spinning head and also independent water analysis test to BS6920 to check the effect of the system on drinking water quality.

The independent BS6920 tests confirmed the acceptable nature of the film and the in situ trials confirmed that the product could be applied by remote control though a spinning head assembly and an excellent film could be formed even under adverse underground conditions.

Furthermore, these trials confirmed that not only would the applied coating provide a high quality lining but also, the system could impart some structural strength characteristics to the pipeline involved.

What is claimed is:

1. A method for forming a two-part coating, the method comprising the steps of:

(a) providing a first part comprising a blend of (i) aliphatic isocyanate, and (ii) a resin, the resin including non-reactive resin and/or a liquid epoxy resin;

(b) providing a second part comprising one or more aromatic amines;

(c) mixing together the first part and the second part to form a mixture;

(d) applying the mixture to a surface to be coated wherein the one or more aromatic amines bond simultaneously with the aliphatic isocyanate and the resin to form a rapid-setting coating on the surface.

2. A method according to claim 1 wherein the liquid epoxide resin is a diglycidyl ether of Bisphenol A.

3. A method according to claim 1 wherein the aliphatic isocyanate is a polyisocyanate derived from hexamethylene di-isocyanate and having an isocyanate content of 20–25%.

4. A method according to claim 1 wherein the diamine is diethyl toluene diamine.

5. A method according to claim 1 wherein the mixture is applied as a high fast setting coating.

6. A method according to claim 1, wherein the mixture is applied by a centrifugal spinning head to internal pipeline surfaces.

7. A method according to claim 1 wherein the mixture is applied through hot airless spray equipment.

8. A method according to claim 1 wherein the mixtures is applied through a self mixing spray gun assembly.

* * * * *